United States Patent [19]
Ishibashi

[11] Patent Number: 4,969,539
[45] Date of Patent: Nov. 13, 1990

[54] BRAKE FOR BICYCLE
[75] Inventor: Hideyuki Ishibashi, Ageo, Japan
[73] Assignee: Bridgestone Cycle Co., Ltd., Japan
[21] Appl. No.: 352,242
[22] Filed: May 16, 1989
[51] Int. Cl.$^5$ .............................................. B62L 3/02
[52] U.S. Cl. ............................. 188/24.21; 188/24.14;
188/24.15; 188/24.22; 188/72.9
[58] Field of Search ............... 188/24.22, 24.11, 24.12,
188/24.14, 24.15, 24.21, 72.9, 59

[56] References Cited
U.S. PATENT DOCUMENTS

| 2,160,181 | 5/1939 | Taylor | 188/24.21 |
| 4,462,488 | 7/1984 | Boyd | 188/24.21 X |
| 4,765,443 | 8/1988 | Cunningham | 188/24.12 X |

FOREIGN PATENT DOCUMENTS

| 598723 | 12/1925 | France | 188/24.11 |
| 964404 | 8/1950 | France | 188/24.12 |
| 56871 | 10/1952 | France | 188/24.21 |
| 1045319 | 11/1953 | France | 188/24.21 |
| 52-3799 | 1/1977 | Japan . | |
| 10929 | of 1907 | United Kingdom | 188/24.11 |
| 317638 | 8/1969 | United Kingdom | 188/24.21 |

Primary Examiner—George E. A. Halvosa
Attorney, Agent, or Firm—Arnold, White & Durkee

[57] ABSTRACT

A caliper type brake for a bicycle, which includes brake members pivotally supported by a frame of the bicycle for supporting brake shoes adapted to be pressed to a rim of a wheel of the bicycle. Each of the brake members is shaped like a bell crank and has one end pivotally connected to the frame of the bicycle and the other end supporting the brake shoe. An operating radius between a pivotal point of each of the brake members and a point of the brake member on which a brake operating force acts is made as small as possible. The brake further inlcudes a generally V-shaped connecting rod whose ends are connected to the brake members, respectively for applying the brake operating force to the brake member, a pulley rotatably provided at an intermediate portion of the connecting rod, and an operating wire extending about the pulley and having one end fixed to the frame of the bicycle.

7 Claims, 13 Drawing Sheets

FIG. 1
_PRIOR ART_

FIG_2a

FIG_2b

FIG_2c

FIG_2d

FIG_2e

FIG_2f

FIG_5a

FIG_8a

BRAKE FOR BICYCLE

BACKGROUND OF THE INVENTION

This invention relates to a caliper brake for a bicycle, whose brake shoes are pressed against side faces of a rim of one wheel of the bicycle to brake it.

In general, there are three kinds of caliper brakes, center-pull, side-pull and cantilever types. The brake of the invention belongs to the cantilever type caliper brake.

Before explaining conventional brakes, frame members of a bicycle are explained referring to FIGS. 2a–2f and 8a and 8b. A bicycle as shown comprises a head tube 1, fork blades 2, a front wheel 3 including a tire 3a and a rim 3b, a top tube 4 (FIG. 2a), a front or down tube 5, a seat tube 6, chain stays 7 and seat stays 8. Another bicycle shown in FIG. 2b comprises a main frame 9. The bicycle further comprises a band brake 10, a rear wheel 11 having a wheel 11a and a rim 11b, a bottom bracket 12, chain wheel cranks 13 and a chain wheel 14.

Figure 1:
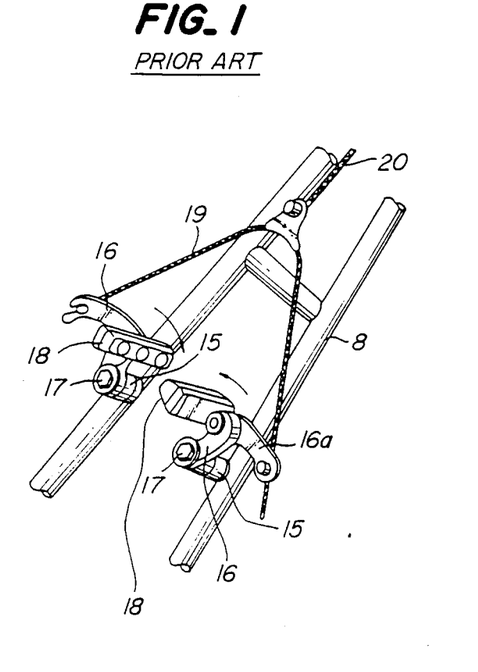
FIG. 1 is a partial perspective view illustrating seat stays of a bicycle using a brake of the prior art.
Figure 2A:
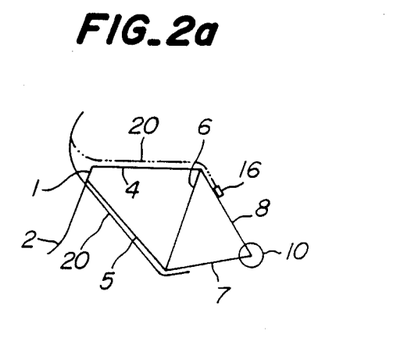
FIGS. 2a–2f are schematic views illustrating various frame configurations of bicycles.
Figure 2B:
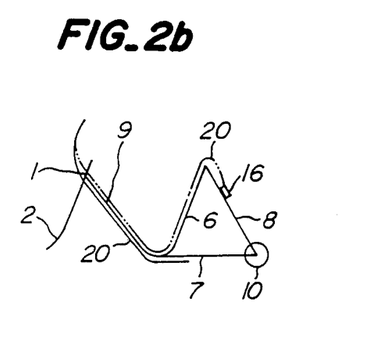
Figure 2C:
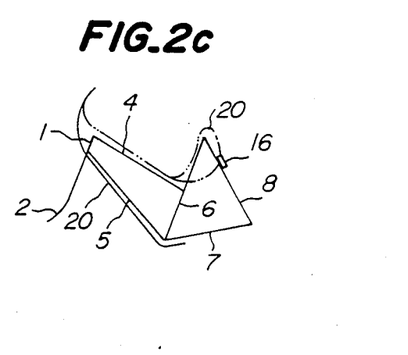
Figure 2D:
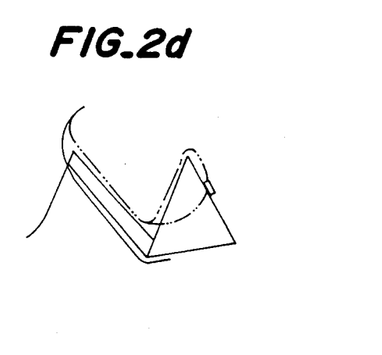
Figure 2E:
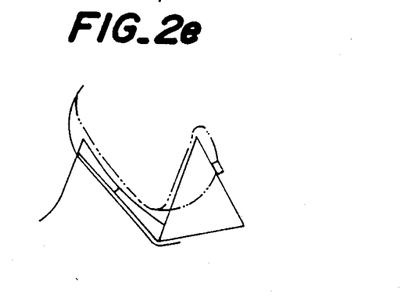
Figure 2F:
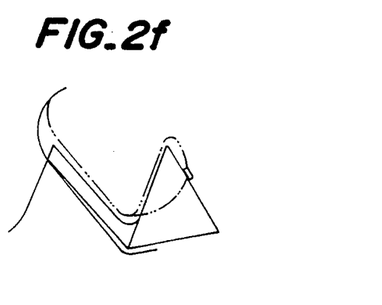

FIG. 1 illustrates one example of a brake of the prior art for a rear wheel. As shown in the drawing, support bases 15 are fixed to the seat stays 8 for pivotally supporting brake members 16 in the form of cantilevers with the aid of bolts 17. The brake comprises brake arms 16a, brake shoes 18 secured to the brake members 16, a connecting wire 19 for connecting the brake arms 16a, and an operating wire 20 connected to a center portion of the connecting wire 19 for operating the brake. FIGS. 2a and 2b illustrate a diamond-shaped frame and a U-shaped frame for bicycles, respectively, and FIGS. 2c and 2d illustrate staggered frames and FIGS. 2e and 2f illustrate roop-shaped frames.

In case of the diamond-shaped frame of the bicycle shown in FIG. 2a, an operating wire 20 connected to brake levers (not shown) provided at handlebars can be easily extended rearwardly along the front tube 5 as shown in a solid line or along the top tube 4 as shown in two-dot-and-dash line without any trouble.

With the bicycles shown in FIGS. 2b–2f other than the diamond-shaped frame bicycle, however, there are many sharply bent portions of the operating wires 20 in order to extend the wire 20 from the handlebars to the seat stays 8. As a result, frictional resistance in the brake wire consisting of an inner and an outer wire disadvantageously increases.

Figure 3:
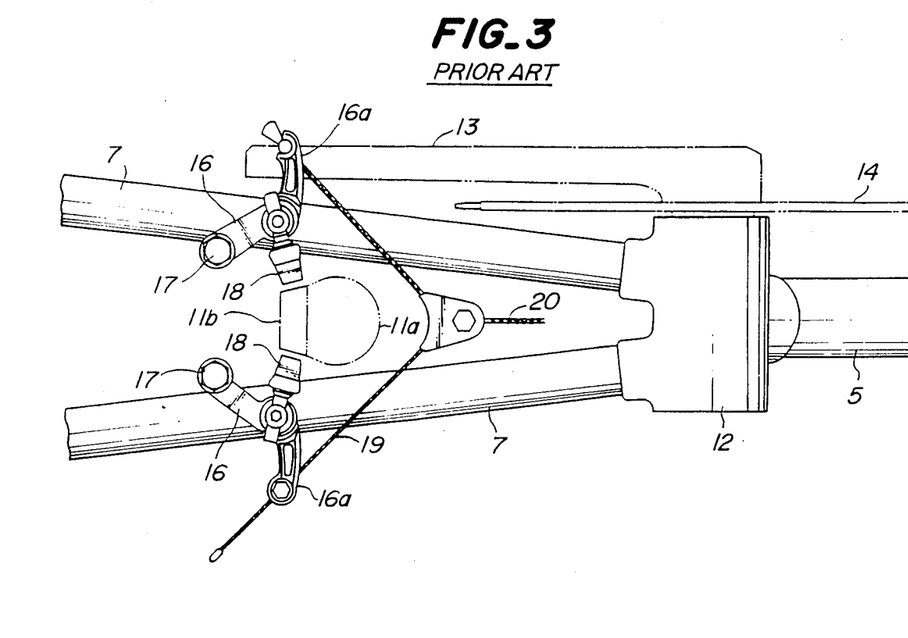
FIGS. 3 and 4 are bottom plan views illustrating brakes of the prior art mounted on chain stays of bicycles.

In order to avoid such many bent portions of the brake wire, the brake may be provided on the chain stays 7. FIG. 3 illustrates the brake of the prior art mounted on the chain stays 7. With this arrangement, however, the arms 16a of the brake members 16 would interfere with the chain wheel cranks 13. Therefore, it is impossible to mount the brake on the chain stays 7.

Figure 4:
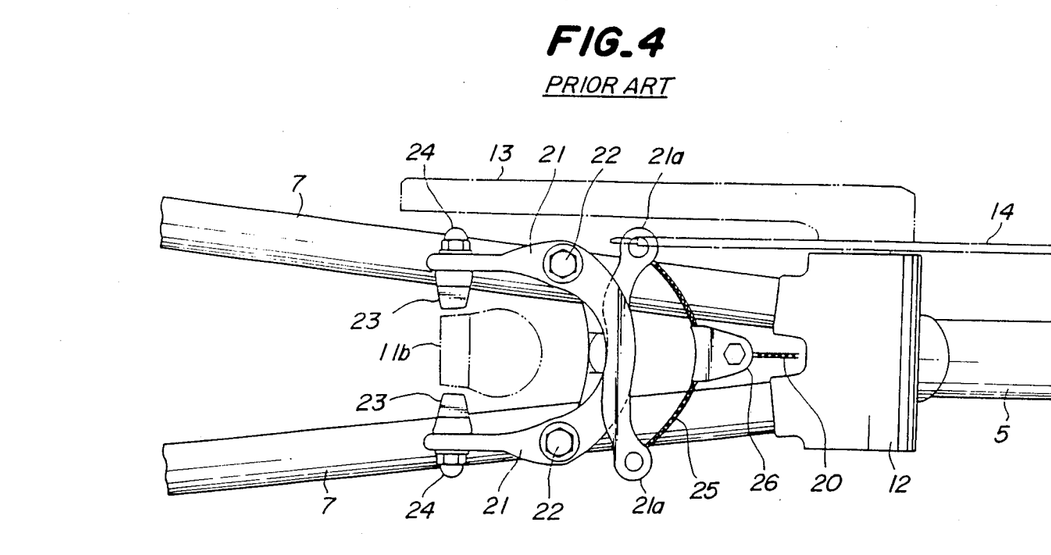

FIG. 4 illustrates a center pull type caliper brake of the prior art mounted on the chain stays 7. Referring to FIG. 4, curved caliper brake arms 21 are pivotally connected with their centers to the chain stays 7 by means of bolts 22 and have brake shoes 23 fixed to their ends by means of bolts 24 in opposition to rims 11b of a wheel of a bicycle. Ends 21a of arms of the caliper brake arms 21 intersecting with each other are interconnected by a connecting wire 25 whose center is connected to an operating wire 20 by a connecting metal member 26.

In this case, however, the ends 21a of the caliper brake arms 21 interfere with the chain wheel 14 like in the case discussed above. Therefore, such a mounting of the brake on the chain stays 7 is also impossible.

In the event that the ends 16a or 21a of the arms interfere with other components of the bicycle, such an interference of the arms may be avoided by limiting the outward extensions of the arms. However, as the rotating radii of the arms become smaller, a force acting upon the operating wire must be increased in order to obtain a pressing force substantially equal to that of the case having the previous longer rotating radii.

However, operating wires are generally used at uppermost limits allowed by their mechanical properties. If the operating wires are subjected to larger forces in use, they would exhibit excessive elongations and the larger forces detrimentally affect their strength and durability.

It has been proposed to use a running block unit having two pulleys rotatably connected by two side plates for a center-pull type brake of a bicycle as disclosed in Japanese Utility Model Application Publication No. 52-3,799. In more detail, an operating wire having one end fixed to a frame of the bicycle extends about one of the pulleys and the other end is pulled when a brake action is applied to the brake. On the other hand, ends of caliper brake arms are connected by a connecting wire whose center extends about the other pulleys.

With this arrangement, since the running block unit is moved a distance one half of a moved distance of the operating wire pulled by an operation of brake levers at handlebars, the force caused by the connecting wire connecting the caliper brake arms is advantageously twice the force on the operating wire caused by the brake levers. However, since strokes of brake shoes become one half of original strokes in case directly pulling the connecting wire without using the running block unit, clearances between the brake shoes and a rim of a wheel of the bicycle must be one half of original clearances. Therefore, the brake shoes are likely to contact the rim of the wheel and require frequent adjustment of clearances particularly in the event that the connecting wire connecting the caliper brake arms have been elongated and movable portions have been worn.

In the case of using the running pulley block in order to reduce the brake operating force to be applied to brake levers at handlebars by a cyclist, strokes of the brake shoes are unavoidably reduced. To eliminate such a disadvantage, strokes of the brake levers must be twice those in the case without using the running pulley block. However, such long strokes of the brake levers would make operation of the brake difficult. According to the invention the operating radii are made small so that even if the strokes of the brake levers remain unaltered, sufficient strokes of the brake shoes and sufficient clearances thereat are obtained.

Moreover, outwardly extending portions of the brake interfere with the feet and clothes of a cyclist and the brake itself is likely to be damaged when the bicycle falls down.

SUMMARY OF THE INVENTION

It is a primary object of the invention to provide an improved caliper brake for a bicycle which eliminates all the disadvantages of the prior art and which includes brake members actuated by light forces without interfering with the feet and clothes of a cyclist, and which is compact in construction and durable in use.

In order to achieve this object, the caliper brake for a bicycle according to the invention comprises brake members pivotally supported by a frame of the bicycle for supporting brake shoes, respectively, an operating radius between a pivotal point of each of the brake members and a point of the brake member on which a brake operating force acts being made as small as possible; a generally V-shaped connecting rod whose ends are connected to the brake members, respectively for applying the brake operating force to the brake members; a pulley rotatably provided at an intermediate portion of said connecting rod; and an operating wire extending about said pulley and having one end fixed to the frame of the bicycle.

With the arrangement according to the invention, since the operating radius between a pivotal point of each of the brake members and the point of the brake member on which a brake operating force acts is made small so as not to interfere with components of the bicycle, it becomes possible to mount the brake on chain stays of the bicycle.

Moreover, according to the invention the operating force of the operating wire connected to the brake levers is transmitted through the force multiplying means such as the running block unit using the pulley to the brake members without direct transmission to the brake members so that the force increased by the multiplying means can be transmitted through the connecting rod to the brake members without increasing the load to be supported by the operating wire.

Therefore, according to the invention, any excessive elongation of the brake operating wire is prevented to ensure the braking action of the brake, while any factors detrimentally affecting the strength and durability of the brake are eliminated in a reliable manner.

According to the invention, although the lever arms of the brake are shortened in order to remove any interference of the brake members with feet and clothes of a cyclist, an increase of the operating force is prevented with the aid of the running block unit and disadvantages of the prior art due to narrow clearance of brake shoes resulting from the use of the running block unit are eliminated by the connecting rod which does not exhibit excessive elongation as in the connecting wire connecting ends of caliper brake arms of the prior art.

The invention will be more fully understood by referring to the following detailed specification and claims taken in connection with the appended drawings.

BRIEF DESCRIPTION OF THE DRAWINGS

FIG. 5b is a bottom plan view of the bicycle shown in FIG. 5a;

FIG. 6b is a bottom plan view of the bicycle shown in FIG. 6a;

FIG. 7b is a bottom plan view of the bicycle shown in FIG. 7a;

FIG. 8b is a bottom plan view of the bicycle shown in FIG. 8a; and

DETAILED EXPLANATION OF THE PREFERRED EMBODIMENTS

Figure 5A:
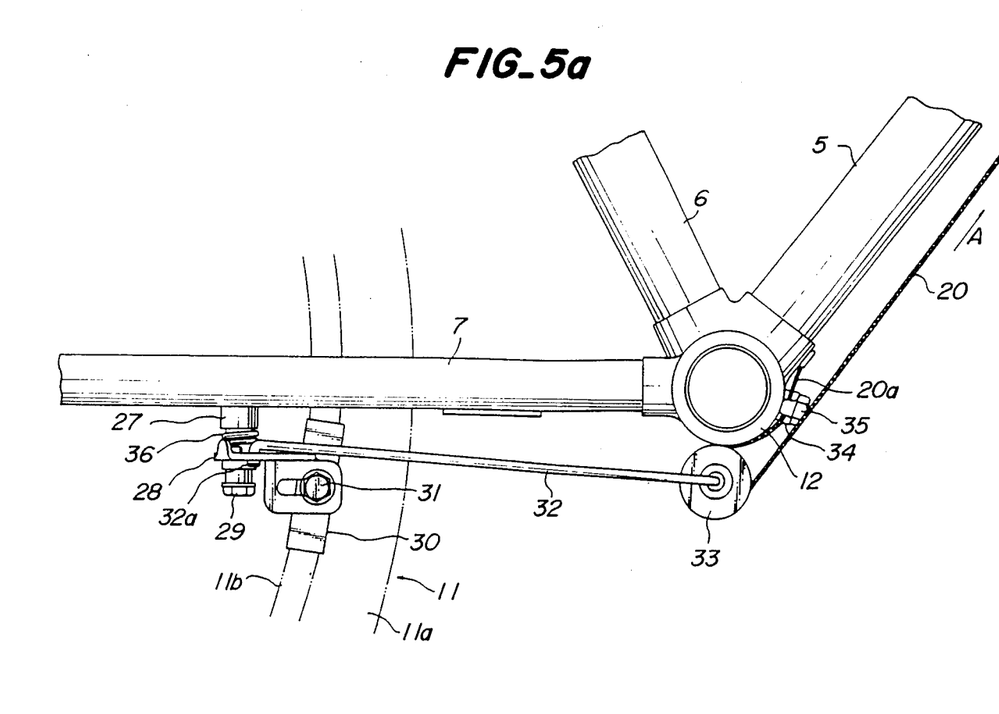
FIG. 5a is a partial side view of a bicycle illustrating a first embodiment of the brake according to the invention.
Figure 5B:
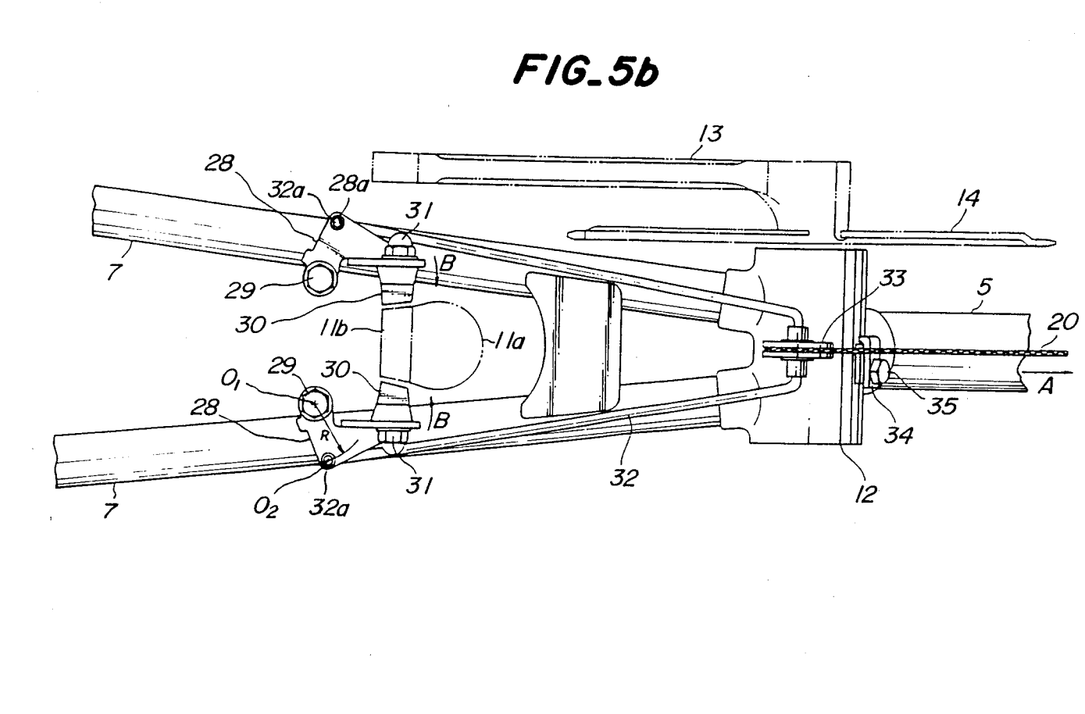

Embodiments of the invention will be explained referring to FIGS. 5a–5b to FIG. 9, among which FIGS. 5a and 5b illustrate a first embodiment of the invention.

In this embodiment, support bases 27 are provided on undersides of chain stays 7 and brake members 28 are formed as crank arms in the form of cantilevers on the support bases 27 for supporting brake shoes 30 of a caliper brake for a bicycle. The brake members 28 are in the form of a bell crank and pivotally supported on the support bases 27 by means of bolts 29. The brake shoes 30 are arranged on the brake members 28 at locations in opposition to rims 11b and fixed to the brake members 28 by means of set screws 31. Each of the brake members 28 is formed in a corner of its mid portion with a connecting aperture 28a into which each of ends 32a of a substantially V-shaped connecting rod 32 is inserted and anchored thereat.

In this case, an operating radius R is a distance between the pivotal point $O_1$ (FIG. 5b) of the brake member 28 to the chain stay 7 by means of the bolt 29 and the pivotal point $O_2$ of the brake member to the connecting rod 32 at which the operating force acts through the rod 32. According to the invention, the operating radius R is made small so as not to interfere with the chain wheel crank 13 and the chain wheel 14, while the operating force of an operating wire 20 connected to brake levers (not shown) is transmitted through a running block unit as force multiplying means to the brake members 28.

In other words, in order to increase the force acting on the brake shoes 30 twice, the running block unit is used which comprises a pulley 33 rotatably provided at a center of the connecting rod 32. The operating wire 20 extends about the pulley 33 and its one end is fixed to a bottom bracket 12 of the bicycle frame by means of a wire fixing metal 34 and a set screw 35. In this embodiment, moreover, the pulley 33 is adapted to roll on an outer circumference of the bottom bracket 12 when the operating wire 20 is being operated. Reference numeral 36 in FIG. 5a denotes a spring (only one shown in the drawing) which serves to return the brake member 28 to its normal position when the brake is released.

Figure 6A:
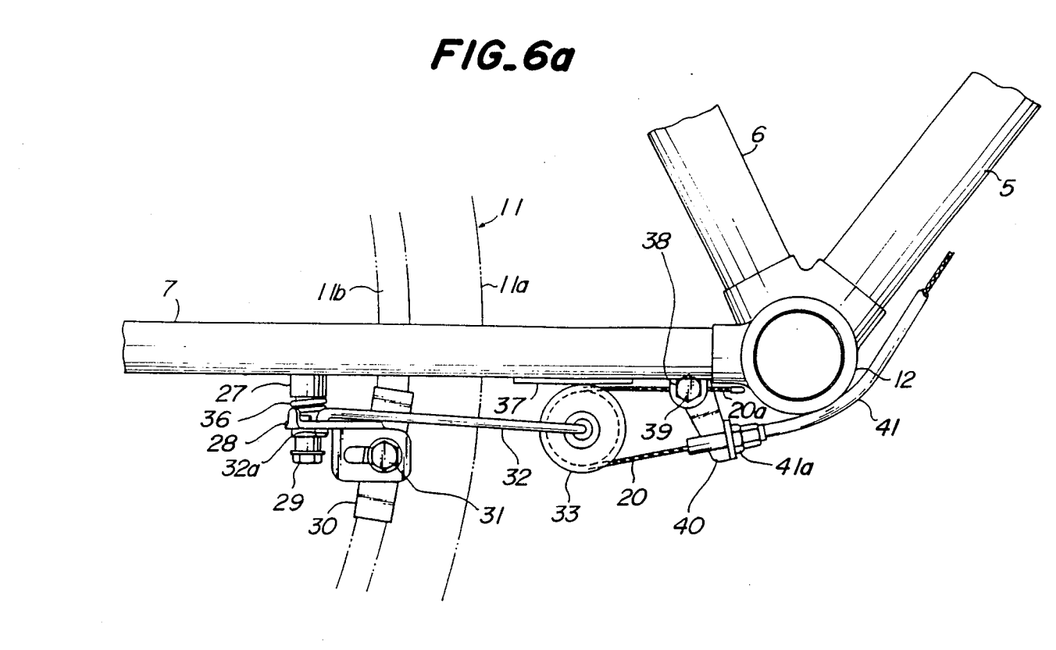
FIG. 6a is a partial side view of a bicycle illustrating a second embodiment of the brake according to the invention.
Figure 6B:
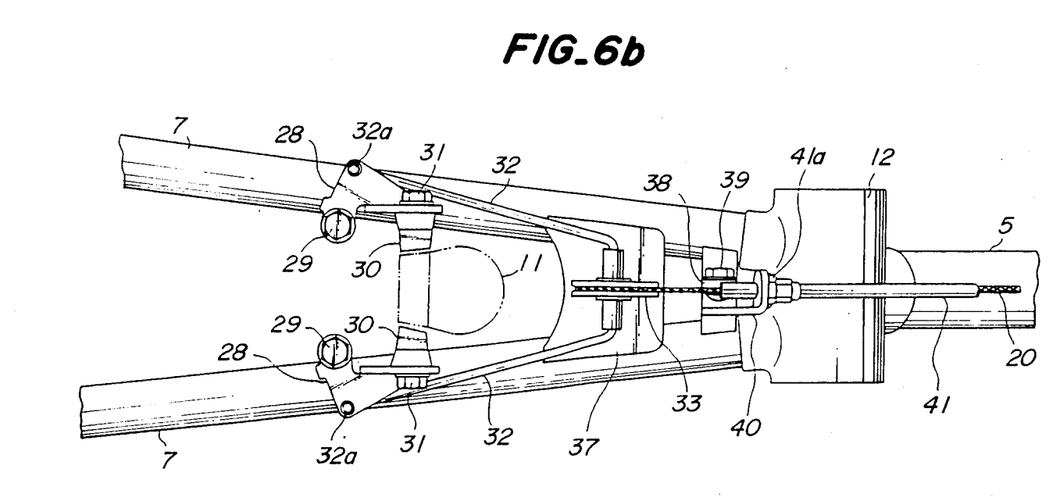

FIGS. 6a and 6b illustrate a second embodiment of the invention, where like parts are designated by the same reference numerals as those in the first embodiment.

The only different features of the second embodiment from those of the first embodiment will be explained. In this embodiment, a connecting plate 37 is bridged or spanned over undersides of the chain stays 7, and a pulley 33 is adapted to roll on an underside of the connecting plate 37. A wire anchoring member 38 is fixed to the undersides of the chain stays 7 close to the bottom 39. An outer wire 41 of the operating wire 20 is secured by an adjusting screw 41a to a bracket 40 provided extending from a base plate portion of the wire anchoring member 38.

Figure 7A:
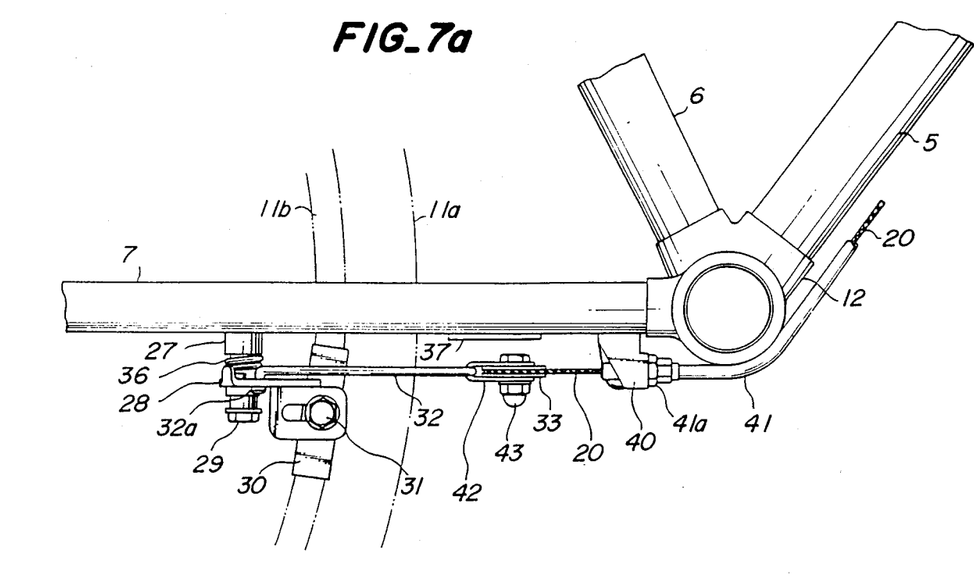
FIG. 7a is a partial side view of a bicycle illustrating a third embodiment of the brake according to the invention.
Figure 7B:
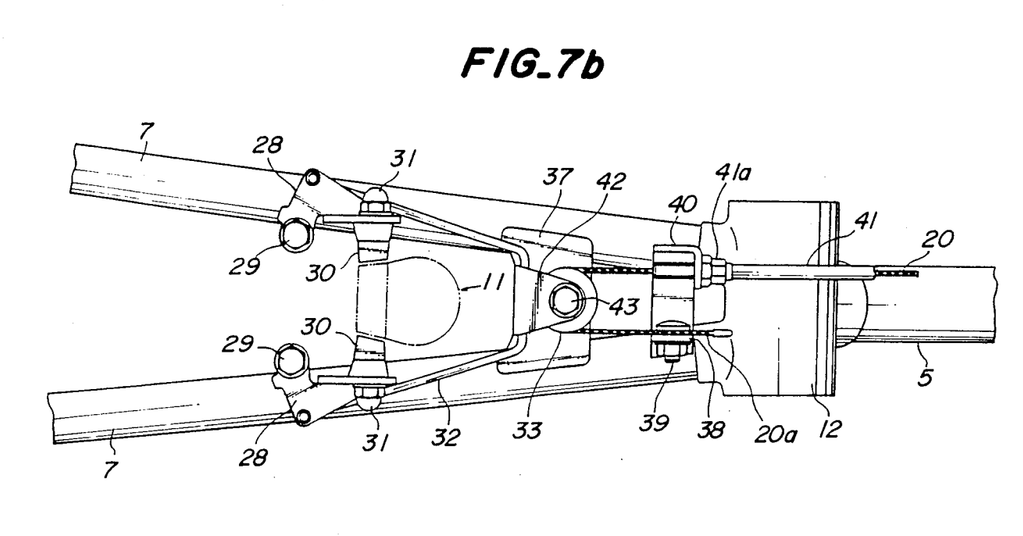

FIGS. 7a and 7b illustrate a third embodiment of the invention, wherein like components are designated by the same reference numerals as those in the previous embodiments.

The only different features of the third embodiment from those of the first and second embodiments will be explained. In this embodiment, a bracket 42 is loosely fitted on an intermediate portion of a connecting rod 32 so as to be rotatable about the intermediate portion, and a pulley 33 in a horizontal position is rotatably supported on the bracket 42 by means of a shaft 43.

Figure 8A:
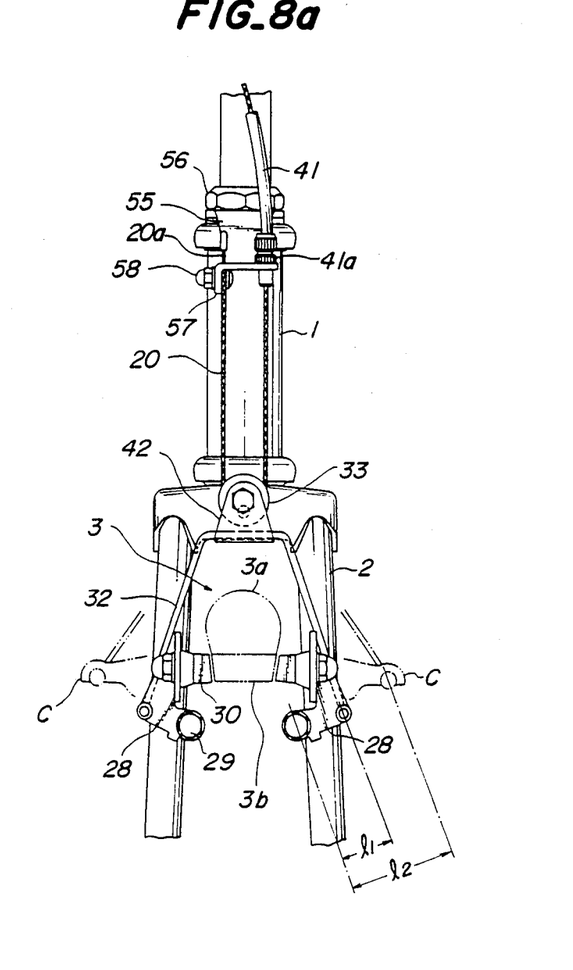
FIG. 8a is a partial side view of a bicycle illustrating a fourth embodiment of the brake according to the invention.
Figure 8B:
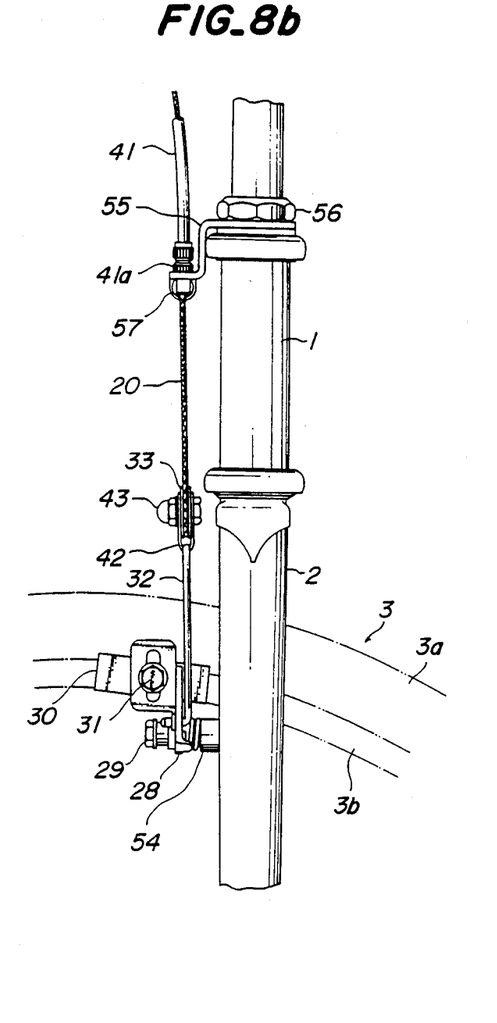

FIGS. 8a and 8b illustrate a fourth embodiment of the invention, wherein like components are identified by the same reference numerals as those of the preceding embodiments.

In the fourth embodiment, a brake substantially the same as that of the third embodiment shown in FIGS. 7a and 7b is used for a front wheel.

In this case, support bases 54 are provided on front faces of fork blades 2 in a manner extending therefrom, respectively (FIG. 8b), and brake members 28 are secured to the support bases 54 by means of bolts 29, respectively. A bracket 55 is fixed to an upper portion of a head tube 1 by means of a nut 56. The bracket 55 is connected to an adjusted screw 41a of an outer wire 41 and formed integrally with a wire anchor 57 to which one end 20a of an operating wire 20 is fixed by means of a set screw 58.

Referring to FIG. 8a, a distance $l_1$ between the pivotal point of the brake member and the point of the brake member on which a brake operating force acts is substantially one half of a distance $l_2$ between corresponding points in the prior art shown in phantom lines so that any risk of extensions of brake members interfering with the feet and clothes of a cyclist is eliminated. The use of the force multiplying means such as running block unit compensates for the increase of force required in braking due to the small distance $l_1$.

Figure 9:
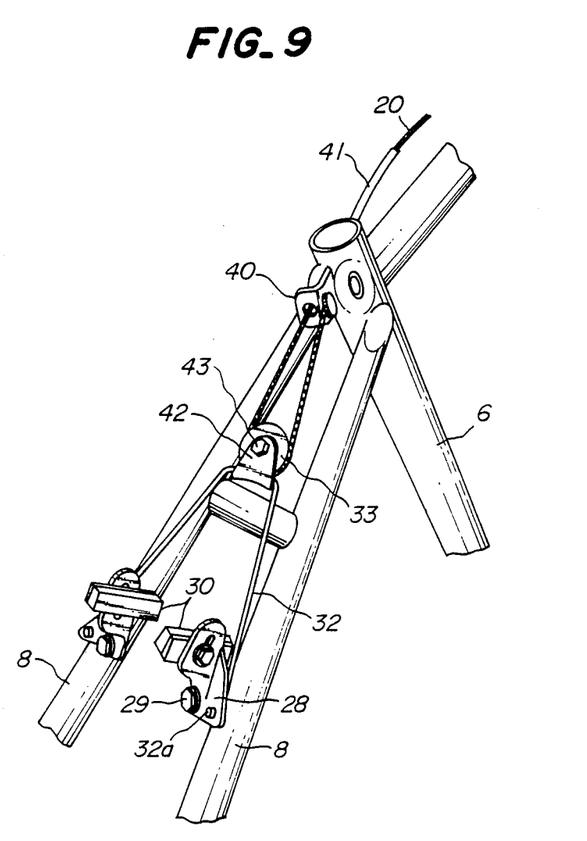
FIG. 9 is a perspective view illustrating a fifth embodiment of the invention in which the brake according to the invention is applied to seat stays of a bicycle.

FIG. 9 illustrates a fifth embodiment of the invention, wherein the brake is applied to seat stays 8 of a bicycle. Brake members 28 supporting brake shoes 30 are pivotally supported on support bases of the seat stays 8 by means of bolts 29. A corner of a mid portion of each of the brake members 28 is formed with a connecting aperture in which each end 32a of a V-shaped connecting rod 32 is inserted and anchored thereat.

To a center portion of a connecting rod 32 is fixed a bracket 42 on which a pulley 33 is rotatably supported by means of a shaft 43.

The operation of the brake according to the invention will now be explained hereinafter. When brake levers (not shown) at handlebars of a bicycle are operated to pull the operating wire 20 forwardly in a direction shown by an arrow A (FIGS. 5a and 5b), the brake members 28 are pivotally rotated through the pulley 33 and the connecting rod 32 about the bolts 29 in directions shown by arrows B so that the brake shoes 30 are pressed against the side faces of the rim of the rear wheel 11 to effect the brake action in the embodiment illustrated in FIGS. 1a and 1b to 3a and 3b.

In this case, owing to the operation of the pulley block unit, the force acting upon the connecting rod 32 is twice the force acting on the operating wire 20 and a stroke of the connecting rod 32 is one half of the movement of the operating wire 20.

Therefore, even if the operating radius R from the pivotal point $O_1$ of the brake members 28 (FIG. 5b) to the pivotal point $O_2$ on which the operating force acts is one half smaller than that in the prior art, the brake shoes 30 exhibit substantially the same braking effect as in the hitherto used brake.

In other words, according to the invention by making the outwardly extending portions of the brake members 28 smaller than those of the prior art, the brake is prevented from interfering with the chain wheel cranks 13 and the chain wheel 14 even in the case the brake is mounted on the chain stays 7.

Moreover, the operating wire 20 suffices to be subjected to substantially the same force as that in the prior art. Therefore, any excessive elongation of the operating wire 20 and lowering of durability are prevented.

In the first to second embodiments shown in FIGS. 5a and 5b to 7a and 7b, the brake members 28 are in the form of cantilevers and the pulley block units are used so that their functions are substantially similar to each other.

In the embodiments shown in FIGS. 8a and 8b and 9, the brakes are applied to front and rear wheels, respectively. In the prior art, the brake greatly extends outwardly so that the outwardly extending portions of the brake interfere with the feet and clothes of cyclists and the brakes themselves tend to be broken or damaged when bicycles fall down. Such a risk is eliminated because the brakes do not have any outwardly extending portions according to the invention.

As can be seen from the above explanation, in the caliper brake for a bicycle according to the invention, the operating radius from the pivotal point of the brake members supporting the brake shoes to the operating force acting point is made small so that the brake members do not interfere with components of the bicycle, with result that the brake can be mounted on chain stays of the bicycle.

In the brake according to the invention, moreover, the operating force of the operating wire connected to brake levers is transmitted to the brake members through a force multiplying mechanism such as the pulley block unit without direct transmission to the brake members so that the increased force is transmitted to the brake members without increasing forces supported by the operating wire.

According to the invention, therefore, the required braking action is ensured without causing any excessive elongation of the brake operating wire, and any cause detrimentally affecting the strength and durability of the brake is eliminated in a reliable manner.

According to the invention, although the lever arms of the brake are shortened in order to remove any interference of the brake members with feet and clothes of a cyclist, an increase of the operating force is prevented with the aid of the running block unit and disadvantages of the prior art due to narrow clearances of brake shoes resulting from the use of the running block unit are eliminated by the connecting rod which does not exhibit excessive elongation as in the connecting wire connecting ends of caliper brake arms of the prior art.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A caliper brake for a bicycle comprising:
bell crank-shaped brake members having a first portion and a second portion arranged substantially perpendicular to said first portion, said first portion being pivotally supported by a frame of the bicycle, said second portion supporting a brake shoe, and a brake operating force point arranged on said brake member substantially at a mid-point between said first and second portions, wherein the portions of said brake members operate substantially within an outwardly extending zone of the bicycle frame;
a substantially V-shaped connecting rod having two straight arm portions and an intermediate portion at which said straight arm portions are joined, said straight arm portions each having an end connected to the brake operating force point of said brake members for applying brake operating force thereto;
a pulley rotatably supported by said intermediate portion of said connecting rod extending through the location of its axis of rotation in the pulley's operating condition, said axis of rotation being coaxial with said intermediate portion; and
an operating wire extending about said pulley and having one end fixed to the frame of the bicycle.

2. The caliper brake of claim 1, wherein said pulley is rolled on a bottom bracket of the frame when the brake is operated.

3. The caliper brake of claim, wherein a connecting plate is provided on an underside of chain stays and said pulley is rolled on the connecting plate when the brake is operated.

4. The caliper brake of claim 1, wherein said brake members are pivotally connected to chain stays of the bicycle frame.

5. The caliper brake of claim 1, wherein said brake members are pivotally connected to fork blades of the bicycle frame.

6. The caliper brake of claim 1, wherein said brake members are pivotally connected to seat stays of the bicycle frame.

7. A caliper brake for a bicycle, comprising:
brake members having a first end pivotally supported by a frame of the bicycle, a second end supporting a brake shoe, and a brake operating force point arranged on said brake members between said first and second ends, wherein the brake members operate substantially within an outwardly extending zone of the bicycle frame;
a connecting rod having ends connected to the brake operating force point of the brake members for applying brake operating force thereto;
a pulley rotatably supported by an intermediate portion of said connecting rod extending through the location of its axis of rotation in the pulley's operating condition, said axis of rotation being coaxial with said intermediate portion; and
an operating wire extending about said pulley and having one end fixed to the frame of the bicycle.

* * * * *